(12) United States Patent
Perez et al.

(10) Patent No.: US 11,462,363 B2
(45) Date of Patent: Oct. 4, 2022

(54) ELECTROLYTIC CAPACITOR HAVING A SHAPED ANODE WIRE THAT PREVENTS FAILURE DUE TO A CRACKED ANODE

(71) Applicant: Greatbatch Ltd., Clarence, NY (US)

(72) Inventors: Anthony C. Perez, Wheatfield, NY (US); Christina Scheuer, Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 17/560,540

(22) Filed: Dec. 23, 2021

(65) Prior Publication Data

US 2022/0208478 A1 Jun. 30, 2022

Related U.S. Application Data

(60) Provisional application No. 63/131,350, filed on Dec. 29, 2020.

(51) Int. Cl.

| | |
|---|---|
| *H01G 9/048* | (2006.01) |
| *H01G 9/10* | (2006.01) |
| *H01G 9/042* | (2006.01) |
| *H01G 9/02* | (2006.01) |
| *H01G 9/008* | (2006.01) |
| *H01G 9/052* | (2006.01) |

(52) U.S. Cl.
CPC ............. *H01G 9/048* (2013.01); *H01G 9/008* (2013.01); *H01G 9/02* (2013.01); *H01G 9/042* (2013.01); *H01G 9/052* (2013.01); *H01G 9/10* (2013.01)

(58) Field of Classification Search
CPC .............................. H01G 9/008; H01G 9/052
See application file for complete search history.

(56) References Cited

U.S. PATENT DOCUMENTS

| | | | | |
|---|---|---|---|---|
| 4,791,532 A | * | 12/1988 | Gouvernelle | H01G 9/052 29/25.03 |
| 5,818,687 A | * | 10/1998 | Shimojima | H01G 9/012 29/25.03 |
| 5,894,403 A | | 4/1999 | Shah et al. | |
| 5,920,455 A | | 7/1999 | Shah et al. | |

(Continued)

FOREIGN PATENT DOCUMENTS

| | | | | |
|---|---|---|---|---|
| JP | 2004247410 A | * | 9/2004 | ............. H01G 9/012 |
| JP | 2007173303 A | * | 7/2007 | |

*Primary Examiner* — Eric W Thomas
(74) *Attorney, Agent, or Firm* — Michael F. Scalise

(57) ABSTRACT

A capacitor having an anode of a pressed powder pellet is described. The pressed powder anode pellet has a contoured trough that extends inwardly into the height of the pellet from a peripheral edge of the pellet. A shaped anode wire has an embedded portion residing inside the pellet and an outwardly extending portion that is connected to the terminal pin of a feedthrough. The feedthrough is nested in the contoured trough. In order to prevent a crack from rendering the anode inoperable, the embedded portion of the anode wire is shaped to bridge the lateral extent of the contoured trough. Should a crack develop in the anode, the crack will intersect the embedded portion of the anode wire. As an embedded bridging wire structure, the crack in the anode pellet will not cause the shaped anode wire to break. Instead, the shaped anode wire provides electrical continuity from one side of the crack to the other so that the capacitor remains functional.

17 Claims, 5 Drawing Sheets

(56) References Cited

U.S. PATENT DOCUMENTS

| | | |
|---|---|---|
| 6,224,985 B1 | 5/2001 | Shah et al. |
| 6,468,605 B2 | 10/2002 | Shah et al. |
| 7,012,799 B2 | 3/2006 | Muffoletto et al. |
| 7,092,242 B1 | 8/2006 | Gloss et al. |
| 7,116,547 B2 | 10/2006 | Seitz et al. |
| 7,271,994 B2 | 9/2007 | Stemen et al. |
| 7,483,260 B2 | 1/2009 | Ziarniak et al. |
| 9,721,730 B1 | 8/2017 | Muffoletto et al. |
| 9,824,829 B1 | 11/2017 | Muffoletto et al. |
| 9,875,855 B2 | 1/2018 | Perez et al. |
| 9,978,528 B2 | 5/2018 | Hahl et al. |
| 10,020,127 B1 | 7/2018 | Muffoletto |
| 2008/0080124 A1* | 4/2008 | Kim .................. H01G 9/08 361/529 |
| 2017/0148576 A1* | 5/2017 | Hahl .................. H01G 9/0425 |
| 2021/0220652 A1* | 7/2021 | Hahl .................. H01G 9/008 |

* cited by examiner

ELECTROLYTIC CAPACITOR HAVING A SHAPED ANODE WIRE THAT PREVENTS FAILURE DUE TO A CRACKED ANODE

CROSS-REFERENCE TO RELATED APPLICATION

This application claims priority to U.S. provisional patent application Ser. No. 63/131,350, filed on Dec. 29, 2020.

BACKGROUND OF THE INVENTION

The present invention generally relates to a capacitor and, more particularly, to a capacitor capable of powering an implantable medical device, such as a cardiac defibrillator.

More specifically, the present invention relates to a novel anode wire that is shaped to prevent a pressed powder pellet-type anode from losing functionality should the anode pellet develop a crack. The shaped anode wire of the present invention is particularly adapted to prevent loss of functionality when the anode has a contoured trough generally centered along the length of an upper edge of the pressed pellet. The contoured trough provides space for the anode wire to connect to the terminal pin of a feedthrough, but the contoured trough can also negatively impact the fracture strength of the anode pellet.

2. Prior Art

U.S. Pat. No. 7,483,260 to Ziarniak et al., which is assigned to the assignee of the present invention and incorporated herein by reference, relates to a capacitor with internally connected pressed powder pellet-type dual anodes. Each of the pressed powder anode pellets has an inner major face wall spaced from an outer major face wall by a surrounding peripheral edge. An anode wire bridges between the dual anodes. The terminal pin of a feedthrough is connected to the intermediate portion of the anode wire between the dual anodes. To form the capacitor, the anode pellets are folded to align their inner major walls facing each other. Cathode material is supported on the major face walls of the casing members, facing the outer major face walls of the opposed anode pellets. There is also an electrically conductive plate supporting cathode material on each of its major sides. This plate resides between the dual anodes so that cathode material faces the opposed inner major face wall of the anode pellets.

To provide space inside the casing for the terminal pin of the feedthrough connected to the bridging anode wire, each of the facing anode pellets has a beveled region at a proximal end of the peripheral edge. The opposed ends of the bridging anode wire extend into the anode pellets at the beveled region. The embedded portions of the bridging anode wire are generally straight.

Even though the dual anodes described by the '260 patent are relatively thin pressed powder structures, there is little concern that the anodes will develop a crack at their respective beveled regions. Since the beveled region is at the proximal end of the peripheral edge of each of the pressed powder pellet-type anodes, the beveled region does not compromise the structural integrity of the anode.

SUMMARY OF THE INVENTION

A capacitor according to the present invention has an anode in the form of a pellet that is pressed into a desired shape from a valve metal powder, preferably selected from tantalum, aluminum, niobium, and titanium powder. The pressed powder anode pellet has opposed major face walls joined by a relatively thin surrounding peripheral edge. The pressed powder anode pellet has an aspect ratio that ranges from about 1.5:1 to 3:1, preferably about 2:1, which means that the pellet is twice as long as it is high. The pressed powder anode pellet has a contoured trough that extends inwardly into the height of the pellet from a planar upper edge portion of the peripheral edge. A shaped anode wire has an embedded portion residing inside the pellet and an outwardly extending portion that is connected to the terminal pin of a feedthrough. However, should the anode develop a crack, the crack could render the anode partially or completely inoperable. The crack is likely to start somewhere along the contoured trough and propagate through the height of the anode toward an opposed portion of the peripheral edge.

In order to prevent a crack from rendering the anode and, consequently, the capacitor partially, or worse yet, completely inoperable, the pressed powder anode pellet of the present invention has a novel shaped anode wire with an embedded portion that is shaped to bridge the lateral extent of the contoured trough. Should a crack develop in the anode, the crack will intersect the embedded portion of the anode wire. As an embedded bridging wire structure, the crack in the anode pellet will not cause the shaped anode wire to break. Instead, the shaped anode wire provides electrical continuity from one side of the crack to the other. Since the shaped anode wire bridges the crack, the anode and capacitor remain functional. This is particularly important when the capacitor is a power source in an implantable medical device, for example a cardiac defibrillator. Should loss of functionality occur in a cardiac defibrillator, it could be life threatening.

These and other aspects of the present invention will become more apparent to those skilled in the art by reference to the following detailed description and the appended drawings.

DETAILED DESCRIPTION OF THE PREFERRED EMBODIMENTS

Figure 1:
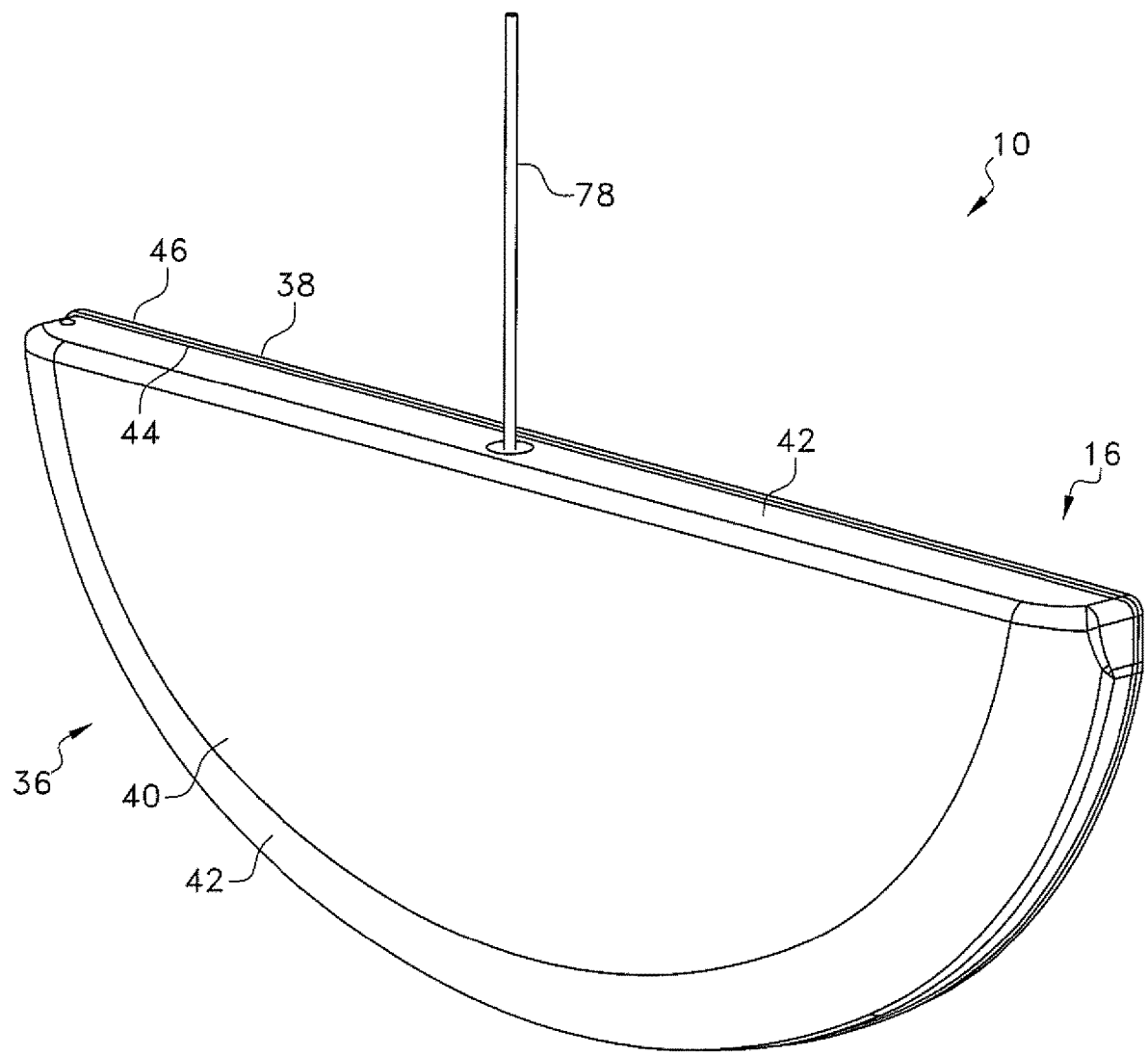
FIG. 1 is a perspective view of a capacitor 10 housed inside a casing 16 comprising a drawn casing member 36 closed by a lid 38 according to the present invention.

FIG. 1 is a perspective view of an exemplary electrolytic capacitor 10 according to the present invention. Preferably, the capacitor 10 is a wet tantalum electrolytic capacitor. As further shown in FIG. 2, the capacitor 10 preferably comprises the anode 12 and a cathode 14 of a cathode material housed inside a hermetically sealed casing 16 (the exemplary casing is indicated with numerical designation 18 in FIG. 2).

Figure 2:
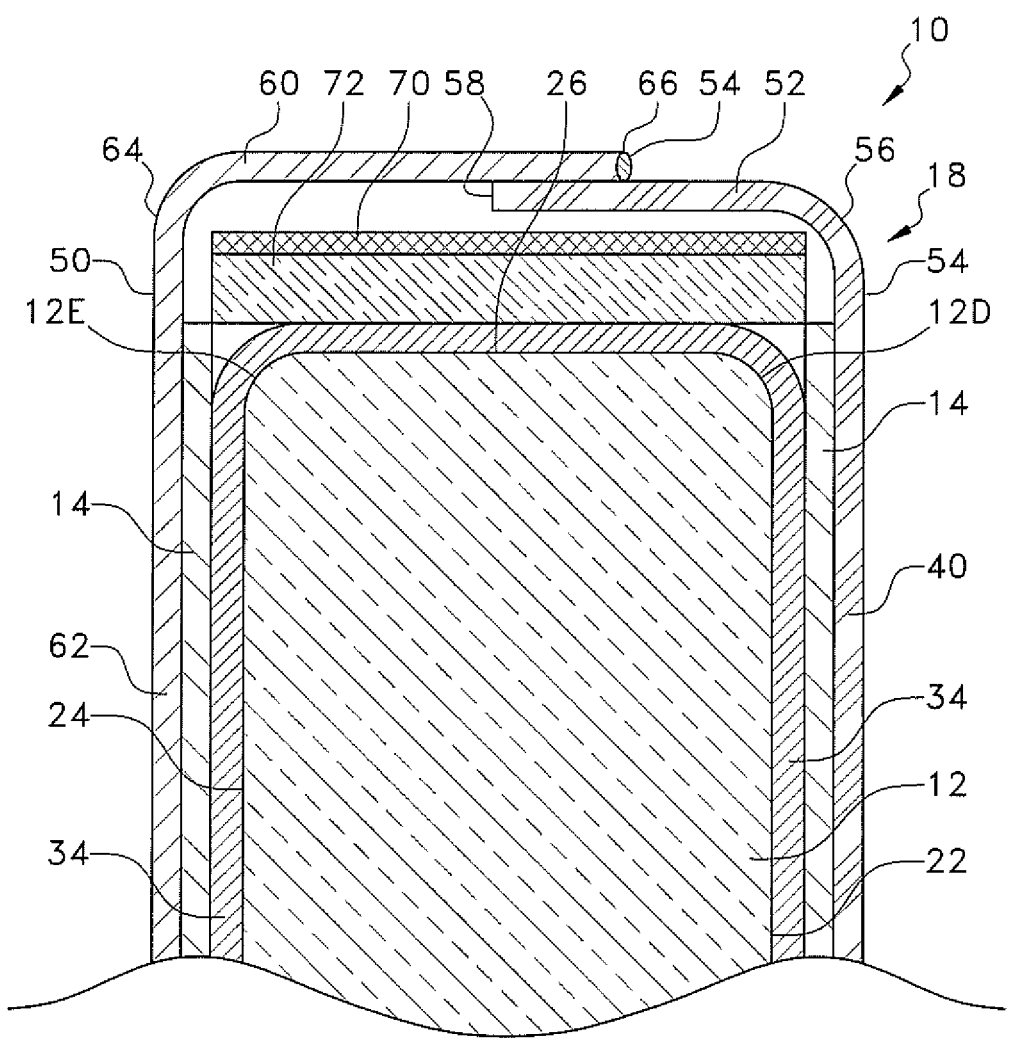
FIG. 2 is a cross-sectional view of another embodiment of a capacitor 10 housed inside a casing 18 of mating drawn clamshell-type members 48 and 50 according to the present invention.

The anode 12 housed inside the exemplary casing 16 illustrated in FIG. 1 and the casing 18 illustrated in FIG. 2 is preferably a pressed powder tantalum pellet. As is well known by those skilled in the art, the anode metal in powdered form, for example tantalum powder, is pressed into a pellet having an outwardly extending portion of a shaped anode wire 20 (FIGS. 3 and 3A) extending therefrom.

Figure 3:
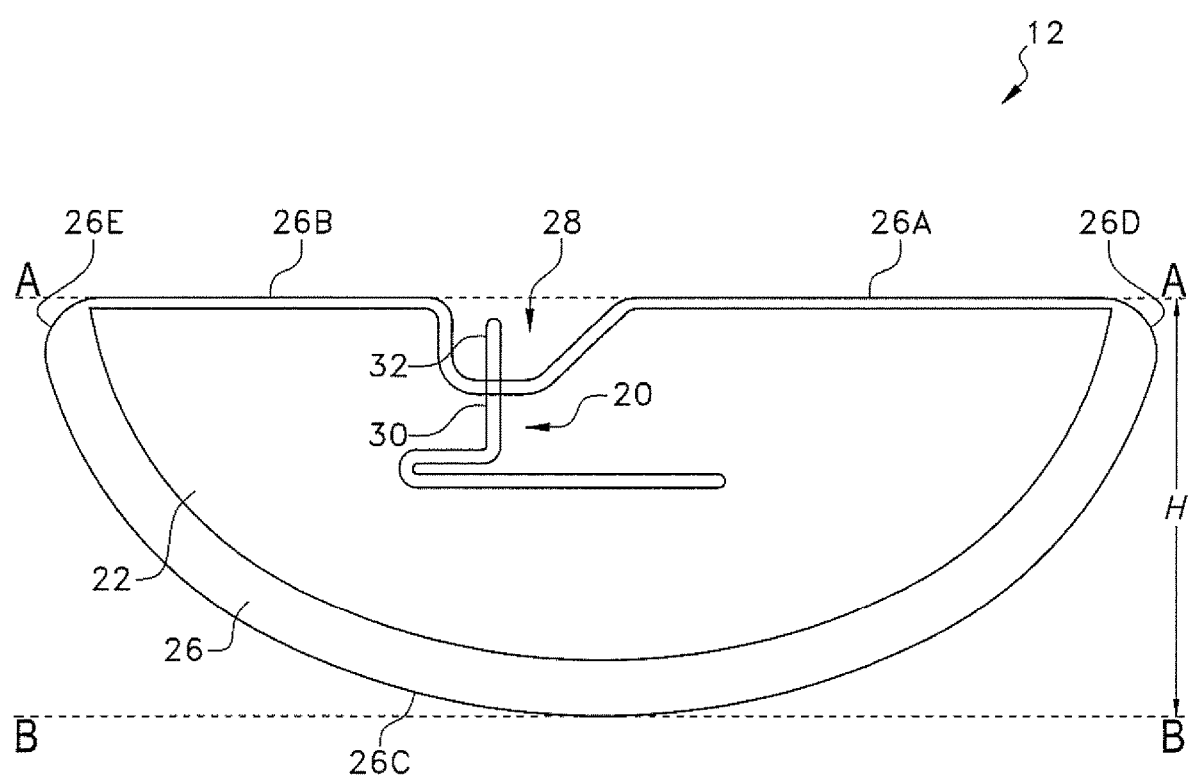
FIG. 3 is an elevation view of the anode 12 showing a contoured trough 28 extending inwardly into its height from an upper edge thereof.
Figure 3A:
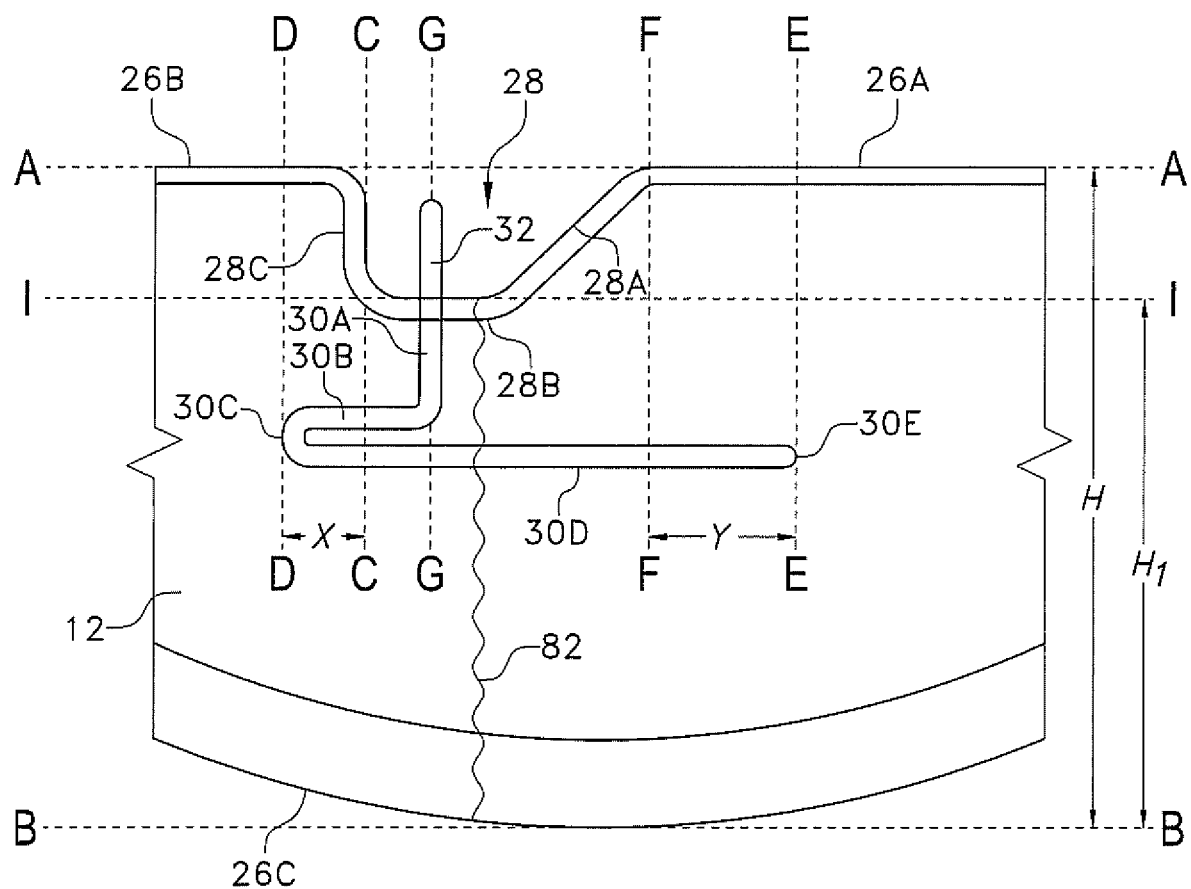
FIG. 3A is an enlarged view of the contoured trough 28 of the anode shown in FIG. 3 including a shaped anode wire 20 having an embedded portion 30 and an outwardly extending portion 32.

In the cross-sectional view shown in FIG. 2 and the side elevational views illustrated in FIGS. 3 and 3A, the pressed powder anode pellet is of a substantially uniform thickness extending to spaced apart planar right and left major face walls 22, 24 joined by a peripheral edge 26. The peripheral edge 26 has a planar right upper edge portion 26A and a planar left upper edge portion 26B. The right and left upper edge portions 26A and 26B are co-planar, both residing along a plane A-A. A compound curved lower edge portion 26C meets the planar right upper edge portion 26A at a rounded right corner 26D and meets the planar left upper edge portion 26B at a rounded left corner 26E. The compound curved lower edge portion 62C also curves upwardly to meet the planar right and left major face walls 22, 24.

A contoured trough 28 delineates the planar right and left upper edge portions 26A, 26B from each other and extends inwardly into the height of the anode 12 from the plane A-A. The height of the anode 12 is measured from the plane A-A to a tangent line B-B that intersects the most distant point on the compound curved lower edge portion 26C. The height of the anode 12 is indicated by the designation "H" in FIGS. 3 and 3A and typically ranges from about 0.6 inches to about 0.75 inches.

With respect to the orientation shown in FIGS. 3 and 3A and beginning at a left end of the planar right upper edge portion 26A, the contoured trough 28 has a slopped trough edge portion 28A that angles downwardly into the height of the anode 12 and to the left to meet a planar trough edge portion 28B. The planar trough edge portion 28B, which is parallel to the planar right and left upper edge portions 26A, 26B, meets a vertical trough left edge portion 280 which, in turn, meets the planar left upper edge portion 26B to thereby complete the shape of the peripheral edge 26 including the contoured trough 28. To help prevent stress risers in the anode pellet 12, there are curved transitions where the planar right upper edge portion 26A meets the slopped trough edge portion 28A, where the slopped trough edge portion 28A meets the planar trough edge portion 28B, where the planar trough edge portion 28B meets the vertical trough left edge portion 28C and where the vertical trough left edge portion 280 meets the planar left upper edge portion 26B.

The anode lead wire 20 has an embedded portion 30 and an outwardly extending portion 32. The embedded portion 30 of the shaped anode wire 20 extends into the anode pellet 12 from the planar trough edge portion 28B and is approximately centered between the front and back planar major face walls 22 and 24.

To form the pressed powder anode pellet into a functional anode 12, the anode pellet including the lead wire 20 are sintered under a vacuum at high temperatures. The porous tantalum body is then anodized in a suitable anodizing electrolyte to fill the pores between adjacent tantalum particles with the electrolyte and form a continuous dielectric oxide film on the sintered body. The assembly is then reformed to a desired voltage, as is well known by those skilled in the art, to produce an oxide layer over the anode pellet 12 and the lead wire 20.

The anode 12 and cathode 14 are in electrical association with each other by a working electrolyte (not shown) contained in the casings 16, 18. Suitable working electrolytes are described in Reissue Pat. No. Re47,435, which relates to U.S. Pat. No. 6,219,222 to Shah et al. and Reissue application Ser. No. 14/534,357, which relates to U.S. Pat. No. 6,687,117 to Liu et al.

The anode 12 and the cathode 14 housed inside the casings 16 and 18 are prevented from direct physical contact with each other by an intermediate separator 34. The separator 34 is also of an electrically insulative material that is chemically unreactive with the anode and cathode materials and is both chemically unreactive with and insoluble in the working electrolyte. In addition, the separator 34 has a degree of porosity that is sufficient to allow flow therethrough of the working electrolyte during the electrochemical reaction of the capacitor 10. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR (DMS Solutech), a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.). Cellulose based separators typically used in capacitors are also contemplated by the scope of the present invention. Depending on the working electrolyte, the separator 34 can be treated to improve its wettability, as is well known by those skilled in the art.

The exemplary casing 16 shown in FIG. 1 has a drawn casing member 36 closed by a lid 38. The casing members 36, 38 are preferably selected from the group of titanium, tantalum, nickel, molybdenum, niobium, cobalt, stainless steel, tungsten, platinum, palladium, silver, copper, chromium, vanadium, aluminum, zirconium, hafnium, zinc, iron, and mixtures and alloys thereof. In addition to being of a drawn form, casing member 18 can be of a machined construction or be formed by a metal injection molding process. Preferably, the casing members 36, 38 have a thickness of about 0.001 inches to about 0.015 inches.

The first casing member 36 has a first face wall 40 joined to a surrounding side wall 42 extending to an edge 44. The second casing member 38 has the shape of a plate with a second face wall (not shown) aligned parallel to the first face wall 40 and having a surrounding edge 46. The casing members 36 and 38 are hermetically sealed together by welding the overlapping or abutting edges 44 and 46 where they contact each other. The weld is preferably provided by laser welding.

As previously discussed, FIG. 2 illustrates another embodiment of an exemplary casing 18 according to the present invention. The casing 18 is made of the same materials previously described for casing 16 with similar thicknesses, but has mating drawn clamshell-type members 48 and 50. The first clamshell-type casing member 48 comprises a surrounding sidewall 52 extending to and meeting with a major face wall 54 at a curved intermediate bend 56. Opposite bend 56, the surrounding sidewall 52 extends to a continuous, perimeter edge 58.

Similarly, the second clamshell-type casing member 50 comprises a surrounding sidewall 60 extending to and meeting with a major face wall 62 at a curved intermediate bend 64. Opposite bend 64, the surrounding sidewall 60 extends to a continuous perimeter edge 66. However, face wall 40 is somewhat smaller than face wall 62 so that its surrounding sidewall 52 fits inside the surrounding sidewall 60 of the second casing member 50 in an overlapping, contact relationship. That way, casing 18 is hermetically sealed by providing a weld 68 at the surrounding sidewall 52 of the first casing member 48 and the edge 66 of the second casing member 50.

As shown in the casing embodiment of FIG. 2, a weld strap 70 is provided directly adjacent to the surrounding sidewall 52 of casing member 48. The weld strap 70 is an annular, ring-shaped member surrounding the anode annular edge 26 and is typically of the same metal as that of the casing members 48, 50. An intermediate polymeric insulating ring 72 seats against the weld strap 70 and a portion of the separator 34 covering the anode 12 including its annular edge 26. The weld strap 70 in conjunction with the insulating ring 72 help shield the separator 34 at the anode annular edge 26 from the heat generated as the casing members 48, 50 are welded together.

Since casings 16 and 18 are made of an electrically conductive metal, they serve as one terminal or contact for making electrical connection between the capacitor 10 and its load.

Other casing structures that are useful with the present capacitor 10 are described in U.S. Pat. No. 7,012,799 to Muffoletto et al., U.S. Pat. No. 7,092,242 to Gloss et al., U.S. Pat. No. 7,271,994 to Sternen et al., U.S. Pat. No. 9,978,528 to Hahl et al., U.S. Pat. No. 9,721,730 to Muffoletto et al., U.S. Pat. No. 9,824,829 to Muffoletto et al., U.S. Pat. No. 9,875,855 to Perez et al. and U.S. Pat. No. 10,020,127 to Muffoletto, all of which are assigned to the assignee of the present invention and incorporated herein by reference.

As shown in FIG. 2, the cathode material 14 preferably coats the inner surfaces of the major face walls 54, 62 of the respective casing members 48, 50 in a pattern that generally mirrors the shape of the right and left major sidewalls 58, 60 of the anode 12. For the casing 16 shown in FIG. 1, the cathode material 14 coats the first face wall 40 and the plate-shaped second face wall (not shown) in a similar manner. The cathode material 14 preferably has a thickness of about a few hundred Angstroms to about 0.1 millimeters and is either directly coated on the inner surfaces of the face walls 40, 62 or it is coated on a conductive substrate (not shown) supported on and in electrical contact with the inner surfaces thereof. The cathode material coatings are preferably spaced from the surrounding sidewalls 52, 60 of the respective casing members 48, 50.

In that respect, the major face walls 40, 62 of the casing members 48, 50 may be of an anodized-etched conductive material, have a sintered active material with or without oxide contacted thereto, be contacted with a double layer capacitive material, for example a finely divided carbonaceous material such as graphite, carbon, platinum black, a redox, pseudocapacitive, or an under potential material, or be an electroactive conducting polymer such as polyaniline, polypyrrole, polythiophene, polyacetylene, and mixtures thereof.

According to one preferred aspect of the present invention, the redox or cathode material 14 includes an oxide of a metal, a nitride of the metal, a carbon nitride of the metal, and/or a carbide of the metal, the oxide, nitride, carbon nitride and carbide having pseudocapacitive properties. The metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead. In a preferred embodiment of the present invention, the cathode material 14 includes an oxide of ruthenium or oxides of ruthenium and tantalum.

A pad printing process as described in U.S. Pat. No. 7,116,547 to Seitz et al. is preferred for providing the cathode coating. An ultrasonically generated aerosol as described in U.S. Pat. Nos. 5,394,403, 5,920,455, 6,224,985, and 6,468,605, all to Shah et al., is also a suitable deposition method. These patents are assigned to the assignee of the present invention and incorporated herein by reference.

With respect to the orientation of the anode 12 shown in FIGS. 3 and 3A, the embedded anode wire portion 30 has a vertical wire section 30A that extends downwardly into the anode pellet 12 to then bend and form into a leftward extending wire section 30B that extends leftwardly and outwardly past an imaginary line C-C aligned along the vertical trough left edge portion 28C of the contoured trough 28. The leftward extending wire section 30B of the embedded anode lead wire portion 30 meets a left U-turn wire section 30C that forms into a rightward extending wire section 30D. The left U-turn wire section 30C is aligned along imaginary line D-D, which is parallel to imaginary line C-C. The distance "X" between imaginary lines C-C and D-D ranges from about 0.1 inches to about 0.2 inches. The rightward extending wire section 30D terminates at an end 30E that is vertically aligned along an imaginary line E-E which intersects the planar right upper edge portion 26A of the peripheral edge 26 at a distance "Y" ranging from about 0.1 inches to about 0.2 inches right of where the slopped trough edge portion 28A meets the planar right upper edge portion 62A at imaginary line F-F. The distances X and Y can be the same or different.

The outwardly extending portion 32 of the anode lead wire 20 is aligned substantially vertically along an axis G-G that is aligned with the vertical wire section 30A of the embedded portion 30 of the anode lead wire.

Imaginary lines C-C, D-D, E-E, F-F and axis G-G are parallel to each ether.

Figure 4:
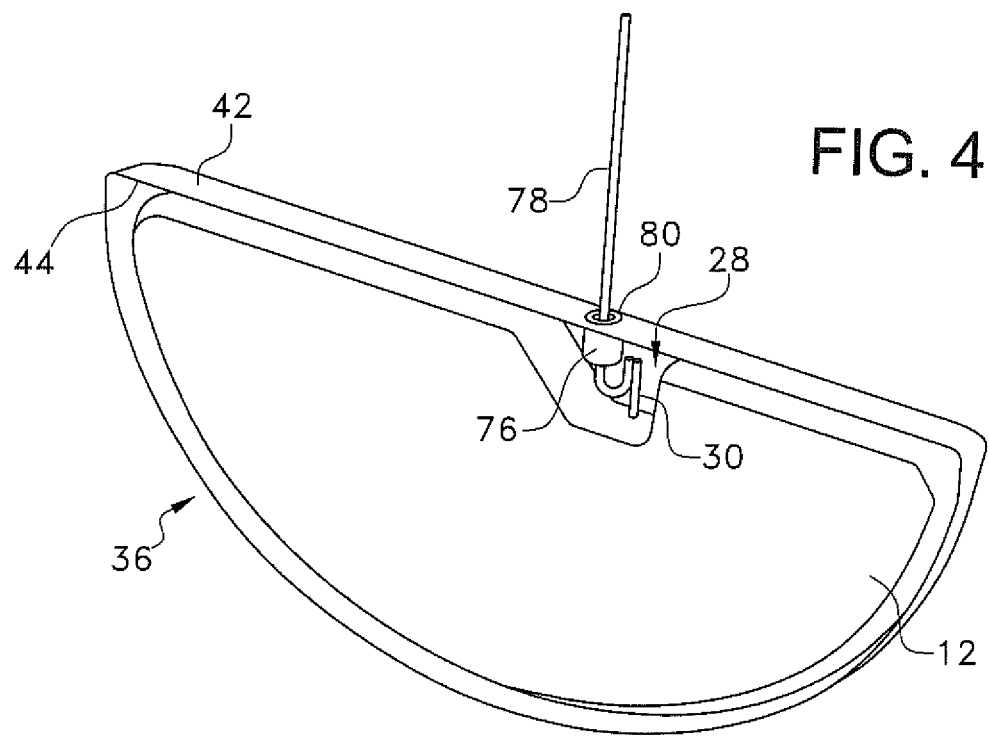
FIG. 4 is a perspective view showing the anode 12 seated in the drawn casing member 36 shown in FIG. 1 with the outwardly extending portion 32 of the anode wire 20 connected to a terminal pin 78 of a glass-to-metal seal received in the contoured trough 28.
Figure 4A:
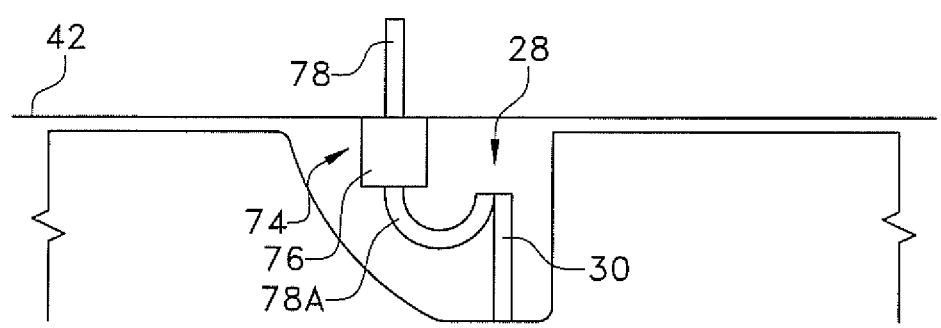
FIG. 4A is an elevational view of the contoured trough 28 shown in FIG. 4 with the outwardly extending portion 32 of the shaped anode wire 20 connected to the terminal pin 78 of the glass-to-metal seal.

FIG. 4 is a perspective view showing the anode 12 seated in the first drawn casing member 36 of FIG. 1. FIG. 4A is a partial broken-away elevational view of the anode 12 shown in FIG. 4 with the extending portion 32 of the anode lead wire 20 connected to a feedthrough 74. The purpose of the contoured trough 28 is to provide a space for the feedthrough 74 to next. As is well known by those skilled in the art, feedthrough 74 is a glass-to-metal seal (GTMS) comprising a ferrule 76 of an electrically conductive metal, for example, titanium defining an internal cylindrical through bore or passage of constant inner diameter. An insulative glass (not shown) provides a hermetic seal between the through bore of the ferrule 76 and a terminal pin or terminal wire 78 passing therethrough. The terminal pin 78 has a J-shaped interior portion 78A that connects to the outwardly extending portion 32 of the anode lead wire 20 extending from within the casing 12. The insulative glass is, for example, ELAN® type 88 or MANSOL™ type 88. The ferrule 76 is received in an opening 80 in the surrounding side wall 42 of the first casing member 36. This connection is preferably a laser weld.

An important aspect of the present capacitor 10 is that the contoured trough 28 extends inwardly into the height "H" of the anode 12. FIG. 3A shows an imaginary line I-I aligned along the planar trough edge portion 28B. The distance from imaginary line I-I to imaginary line B-B is indicated as "$H_1$" and ranges from about 0.45 inches to about 0.6 inches. This means that the depth of the contoured trough 28 is calculated as $H-H_1$ and ranges from about 0.1 inches to about 0.15 inches. The contoured trough 28 is necessary to provide a space for the GTMS including the ferrule 76 and the terminal pin 78 with its J-shaped interior portion 78A connected to the outwardly extending portion 32 of the anode lead wire 20. However, since the height ($H_1$) of the anode at the contoured trough 28 is less that the height of the anode at the remainder of the planar right and left upper edge portions 26A and 26B, the anode is more susceptible to cracking at the contoured trough 28. Should a crack 82 (FIG. 3A) occur, it will generally propagate downwardly from the contoured trough 28 toward the compound curved lower edge portion 26G. This can effectively render the anode in two section separated by the crack 62.

However, the embedded anode lead wire portion 30 is specifically designed to bridge any potential crack radiating from the contoured trough 28 so that electrical continuity is not lost, between the two anode portions on either side of the crack 82. That is why the leftward extending anode wire section 30B, the left U-turn anode wire section 30C and the left portion of the rightward extending anode wire section 30D are spaced outwardly from the imaginary line C-C aligned along the vertical trough left edge portion 28C by the distance "X" indicated in FIG. 3A. Similarly, the right portion of the rightward extending wire section 30C is spaced outwardly from the imaginary line F-F aligned along where the right upper edge portion 26A meets the slopped trough edge portion 28A. Any potential crack 82 in the anode 12 is likely to form between imaginary lines C-C and F-F, as shown in FIG. 3A. The distance from imaginary line C-C to imaginary line F-F is the lateral extent or width of the contoured trough 28. Likewise, the distance from imaginary line D-D to imaginary line E-E is the lateral extent or width of the embedded portion 30 of the anode wire 28. Consequently, the width of the embedded portion 30 is greater than the width of the contoured trough 28 by the combined distances of X plus Y (FIG. A).

It is also noted that; the orientation of the embedded portion 30 of the anode wire 28 can be reversed from that which is shown in FIGS. 3 and 3A. All that is required is that the width of the embedded portion 30 is greater than the width of the contoured trough 28.

Thus, the anode wire of the present invention is shaped to bridge the lateral extent or width of the contoured trough 28. Should a crack develop in the contoured trough 28 of the anode 12, the crack will intersect the embedded portion of the shaped anode wire, but the cracked anode pellet will not cause the anode wire to break. Instead, the shaped anode wire provides electrical continuity from one side of the crack to the other. Since the anode wire bridges the crack, the anode and capacitor remain functional. This is particularly important when the capacitor is a power source in an implantable medical device, for example a cardiac defibrillator. Should loss of functionality occur in a cardiac defibrillator, it could be life threatening.

Although several embodiments of the present invention have been described in detail, that is for purposes of illustration. Various modifications of each embodiment may be made without departing from the spirit and scope of the present invention. Accordingly, the present invention is not to be limited, except as by the appended claims.

What is claimed is:

1. An anode for a capacitor, the anode comprising:
   a) an anode pellet of an anode active material comprising a surrounding peripheral edge extending to a first major face wall spaced from and opposed to a second major face wall, wherein the anode pellet has an anode pellet height;
   b) a contoured trough having a trough depth extending into the anode pellet height from the peripheral edge, the contoured trough having a trough width defined by spaced apart right and left trough edge portions; and
   c) an anode wire having an embedded anode wire portion embedded in the anode pellet and an extending anode wire portion extending outwardly from the anode pellet, wherein the embedded anode wire portion is aligned vertically under the contoured trough and is defined by a rightward extending wire section and a leftward extending wire section that extend laterally outwardly beyond the respective right and left trough edge portions to provide the embedded anode wire portion with a width that is greater than the trough width.

2. The anode of claim 1, wherein the anode pellet is a pressed powder pellet.

3. The anode of claim 1, wherein the anode pellet is of a valve metal powder selected from the group of tantalum, aluminum, niobium, or titanium.

4. A capacitor, comprising:
   a) a casing comprising first and second casing portion that are hermetically sealed to each other;
   b) an electrode assembly housed inside the casing, the electrode assembly comprising a separator disposed between an anode and a cathode, the anode comprising:
      i) an anode pellet of an anode active material comprising a surrounding peripheral edge extending to a first major face wall spaced from and opposed to a second major face wall, wherein the anode pellet has an anode pellet height;
      ii) a contoured trough having a trough depth extending into the anode pellet height from the peripheral edge, the contoured trough having a trough width defined by spaced apart right and left trough edge portions; and
      iii) an anode wire having an embedded anode wire portion embedded in the anode pellet and an extending anode wire portion extending outwardly from the anode pellet, wherein the embedded anode wire portion is aligned vertically under the contoured trough and is defined by a rightward extending wire section and a leftward extending wire section that extend laterally outwardly beyond the respective right and left trough edge portions to provide the embedded anode wire portion with a width that is greater than the trough width; and
   c) a working electrolyte provided in the casing in contact with the anode and the cathode.

5. The capacitor of claim 4, wherein the anode pellet is a pressed powder pellet.

6. The capacitor of claim 4, wherein the anode pellet is of a valve metal powder selected from the group of tantalum, aluminum, niobium, or titanium.

7. The capacitor of claim 4, wherein the anode is a pressed pellet of tantalum powder and the cathode is of ruthenium oxide.

8. The capacitor of claim 4, wherein the casing is selected from the group of titanium, tantalum, nickel, molybdenum, niobium, cobalt, stainless steel, tungsten, platinum, palladium, silver, copper, chromium, vanadium, aluminum, zirconium, hafnium, zinc, iron, and alloys thereof.

9. The capacitor of claim 4, wherein the outwardly extending portion of the anode wire is connected to a terminal pin of a feedthrough.

10. The capacitor of claim 9, wherein the feedthrough is nested in the contoured trough.

11. A capacitor, comprising:
    a) a casing comprising first and second casing portion that are hermetically sealed to each other;
    b) an electrode assembly housed inside the casing, the electrode assembly comprising a separator disposed between an anode and a cathode, the anode comprising:
        i) an anode pellet of an anode active material comprising a surrounding peripheral edge extending to a first major face wall spaced from and opposed to a second major face wall, wherein the anode pellet has an anode pellet height;
        ii) a contoured trough having a trough depth extending into the anode pellet height from the peripheral edge, the contoured trough having a trough width defined by spaced apart right and left trough edge portions that meet the peripheral edge at respective right and left curved transitions; and
        iii) an anode wire having an embedded anode wire portion embedded in the anode pellet and an extending anode wire portion extending outwardly from the anode pellet, wherein the embedded anode wire portion is aligned under the contoured trough and is defined by a rightward extending wire section and a leftward extending wire section that extend laterally outwardly past the respective right and left trough edge portions to provide the embedded anode wire portion with a width that is greater than the trough width; and
    c) a working electrolyte provided in the casing in contact with the anode and the cathode.

12. The capacitor of claim 11, wherein the anode pellet is a pressed powder pellet.

13. The capacitor of claim 11, wherein the anode pellet is of a valve metal powder selected from the group of tantalum, aluminum, niobium, or titanium.

14. The capacitor of claim 11, wherein the anode is a pressed pellet of tantalum powder and the cathode is of ruthenium oxide.

15. The capacitor of claim 11, wherein the casing is selected from the group of titanium, tantalum, nickel, molybdenum, niobium, cobalt, stainless steel, tungsten, platinum, palladium, silver, copper, chromium, vanadium, aluminum, zirconium, hafnium, zinc, iron, and alloys thereof.

16. The capacitor of claim 11, wherein the outwardly extending portion of the anode wire is connected to a terminal pin of a feedthrough.

17. The capacitor of claim 16, wherein the feedthrough is nested in the contoured trough.

* * * * *

UNITED STATES PATENT AND TRADEMARK OFFICE
CERTIFICATE OF CORRECTION

PATENT NO. : 11,462,363 B2
APPLICATION NO. : 17/560540
DATED : October 4, 2022
INVENTOR(S) : Anthony C. Perez and Christina Scheuer It is certified that error appears in the above-identified patent and that said Letters Patent is hereby corrected as shown below:

In the Specification

Column 3, Line 45, delete "280" and insert --28C--

In the Claims

Column 8, Line 35, Claim 4, delete "portion" and insert --portions--
Column 9, Line 15, Claim 11, delete "portion" and insert --portions--

Signed and Sealed this
Third Day of January, 2023

Katherine Kelly Vidal
*Director of the United States Patent and Trademark Office*